United States Patent Office 3,536,995
Patented Oct. 27, 1970

3,536,995
DIGIT PHASEMETER PROVIDING A DIRECT MEASURE, IN DEGREES, OF THE DIGIT VALUE OF A PHASE SHIFT
Pierre Joly, Vernon, France, assignor to The French State, represented by the Minister of Armed Forces, Ministerial Delegation for Weapons, Technical Direction of Land Weapons, Laboratory of Ballistic and Aerodynamics Research of Vernon, Paris, France
Filed Mar. 11, 1968, Ser. No. 712,229
Claims priority, application France, Mar. 17, 1967, 99,297
Int. Cl. G01r 27/00, 25/00
U.S. Cl. 324—57            10 Claims

ABSTRACT OF THE DISCLOSURE

A digit phasemeter comprising a generator of a reference stepped sine signal applied to the input of an element to be controlled, a zero detector connected to the output of said element and a measuring counter totalizing the number of clock pulses emitted by a clock pulse generator between the time the reference sine signal passes through its zero-value position and each time the phase-shifted signal passes through zero. The digit value recorded in the measuring counter corresponds to the number of degrees of the phase shift. The phasemeter provides a direct measure, in degrees, of the digit value of the phase shift.

SUMMARY OF THE INVENTION

The present invention is concerned with digit phasemeters and has specific reference to a digit phasemeter of the type designed for measuring the phase shift introduced by an element to be controlled, this phasemeter being characterized in that it comprises in combination a generator of clock pulses at a constant but adjustable frequency $f$, the output of said clock pulse generator being connected to a generator producing a reference sine signal of very low frequency $f_1$ linked to the clock pulse frequency $f$ by the relationship $f=360\ kf_1$ ($k$ being an integer), the output of said sine signal generator being connected to the input of the element to be controlled, a zero detector connected to the output of said element to be controlled, for the purpose of detecting the time when the phase-shifted signal from said element attains its zero value, a measuring counter connected to said clock pulse generator and integrating the number of pulses emitted by said block pulse generator, indicator means connected to said measuring counter and circuit means for resetting and subsequently restarting said measuring counter each time the reference sine signal passes through its zero-value position, and subsequently, each time the phase-shifted signal passes through zero, stopping said measuring counter, whereby the digit value recorded in said measuring counter at that time corresponds to the number of degrees of the phase shift between the reference sine signal and the signal obtaining at the output of said controlled element.

A phasemeter according to this invention is advantageous in that it provides a direct measure, in degrees, of the digit value of the phase shift.

The measuring counter recording the digit value of the phase shift is connected to a suitable memory device adapted to store the information and also to display it for example by using luminous tubes.

BRIEF DESCRIPTION OF THE DRAWINGS

A typical form of embodiment of the phasemeter according to this invention will now be described by way of example with reference to the accompanying drawing, in which.

DESCRIPTION OF THE PREFERRED EMBODIMENTS

Figure 1:
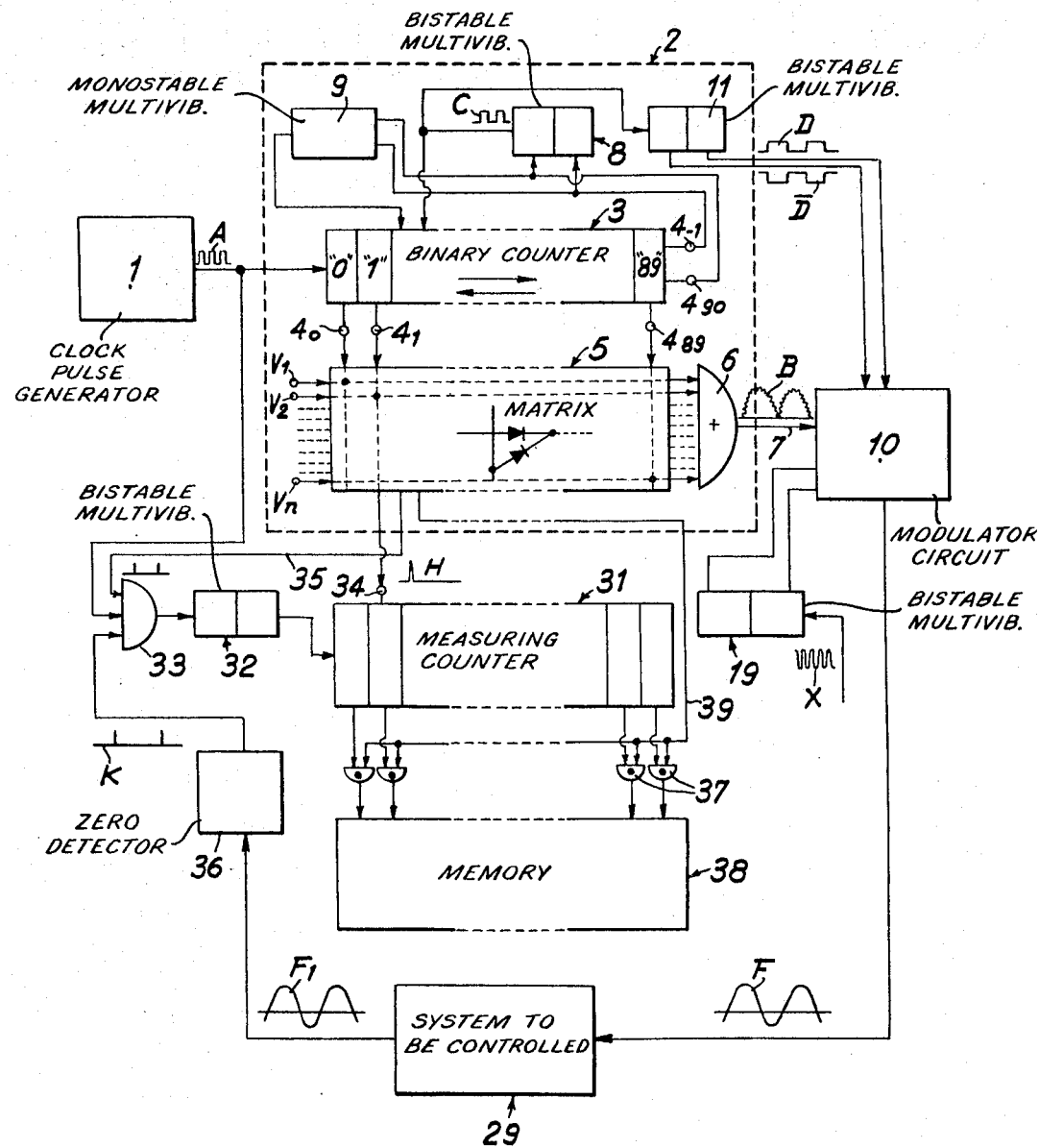
FIG. 1 is a block diagram showing the essential components of a digit phasemeter according to this invention.

The apparatus comprises a generator 1 of clock pulses having a constant but adjustable frequency, such as a multivibrator having a single-junction transistor, or any other suitable generator, and its relaxation circuit which may be acted upon for varying the pulse frequency. The signal A emitted by said generator 1 and having a frequency $f$ is shown in the diagram of FIG. 2 and consists of a train of square pulses.

The signal A emitted by said generator 1 is fed to the input of a rectified sine signal generator shown in its general form at 2. This generator 2 comprises a binary counter 3 having two progression directions (shown by two opposite arrows), and receiving at its input the signal A from generator 1. This counter 3 has 90 positions or stages numbered from "0" to "89," each position having an output terminal associated therewith, the drawing showing only the output terminals $4_0$, $4_1$ and $4_{89}$ corresponding respectively to the stages or positions numbered "0" "1" and "89." The output terminals $4_0$, $4_1$ and $4_{89}$ are connected respectively to the vertical inputs of a diode-type logical matrix 5 having its horizontal inputs connected respectively to $n$ sources of direct currents $V_1, V_2 \ldots V_n$ of different amplitudes increasing in this order. The diode matrix 5 comprises $n$ outputs displaying respectively the voltages $V_1, V_2 \ldots V_n$ which are transmitted via an OR circuit 6 to a single common output line 7.

Figure 2:
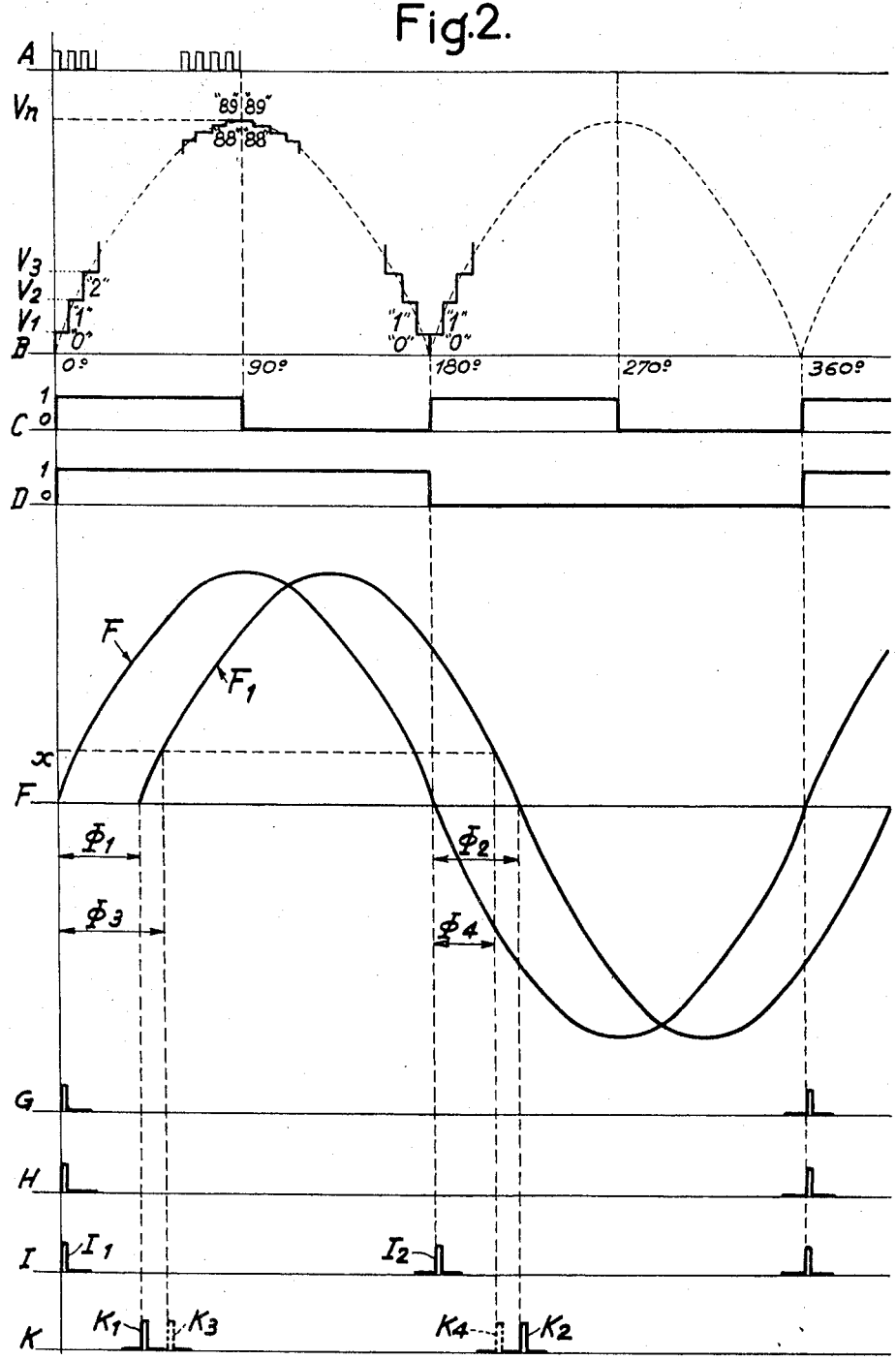
FIG. 2 is a waveform diagram concerning the signals produced at different points of the circuit of the apparatus illustrated in FIG. 1.

The direct voltages $V_1, V_2 \ldots V_n$ are selected to deliver to said output line 7, as a function of their distribution in time which is determined by the outputs of counter 3, a "stepped" signal B shown in diagrammatic form in FIG. 2. This signal B has the shape of a rectified sine wave and a very low frequency $f_1$ corresponding to the relationship $f=360\ kf_1$, wherein $k$ is an integer permitting of determining the degree of precision of the apparatus. In the exemplary form of embodiment described hereinafter $k=1$; in other words, each step of the sine wave B corresponds to a clock pulse of the signal A delivered by generator 1.

Each pulse thus corresponds to one degree, and 260 pulses of signal A are transmitted during one cycle of the complete sine signal F and to be described presently. Of course, $k$ may be greater than 1 in order to increase the accuracy of the apparatus and in this case each elementary pulse would correspond to $1/k$ degree.

As the counter 3 receives the successive clock pulses delivered by the generator 1, the output terminals $4_0$, $4_1 \ldots 4_{89}$ thereof are successively energized and the output signals of counter 3 cause voltage steps $V_1, V_2 \ldots V_n$ to appear in succession in the common line 7 in order to produce the first quarter-wave of the sine signal B of FIG. 2.

In order to achieve a perfect symmetry in the full cycle of the very low frequency signal B, this cycle is obtained by quarter-waves each corresponding to a complete revolution of the counter having a digit capacity of 90.

To generate the second quarter-wave and thus achieve a complete alternation of the "rectified" sine signal B, the counter 3 (designed for operation in two directions) is moved backwards.

The direction of operation of this counter 3 is controlled by a reversing bistable multivibrator 8. When the counter 3 counts the input pulses in the increase direction (i.e. from "0" to "89"), or in other words when it operates in the forward direction during the first quarter wave of signal B, the reversing multivibrator 8 is in position "1" and when the counter 3 counts the pulses in the decrease or reverse direction, the multivibrator 8 is in position "0." The output signal C of the bistable multivibrator 8, which is designated by the corresponding reference letter in FIG. 2, is therefore a period square signal varying between levels "0" and "1" and having the same frequency as the "rectified" sine signal B.

The counter 3 has two output terminals, designated by the reference symbols $4_{90}$ and $4_{-1}$, whereat the signals appear respectively when the counter 3 records the input pulses A and is respectively in posiitons "89" and "0." These terminals are connected to the reversing multivibrator 8. When a signal appears at terminal $4_{90}$ the multivibrator 8 is changed from position "1" to position "0," and when the signal appears at terminal $4_{-1}$ the reverse movement is obtained, i.e. the multivibrator 8 is switched from position "0" to position "1."

Under these conditions, the signals appearing at terminals $4_{90}$ and $4_{-1}$ cause the switching of the reversing mutlivibrator 8 and therefore a reversal in the direction of operation of counter 3. The signals appearing at terminals $4_{-1}$ and $4_{90}$ are also fed to a monostable multivibrator 9 acting in feedback relationship with respect to counter 3. This monostable multivibrator 9 controls the counter 3 in such a way that when a signal is applied to terminal $4_{90}$ it instantaneously restores the counter 3 to its position "89," so that the digit "89" is integrated twice in the counter, this corresponding to the crest of the sine wave alternation, as illustrated along the line B of FIG. 2. Similarly, when a signal appears at terminal $4_{-1}$ the monostable multivibrator 9 actuates the binary counter 3 to restore same to position "0" so that the value "0" is counted twice in succession.

Thus a sine wave having a perfect symmetry is obtained as clearly illustrated by the signal B of FIG. 2.

Figure 3:
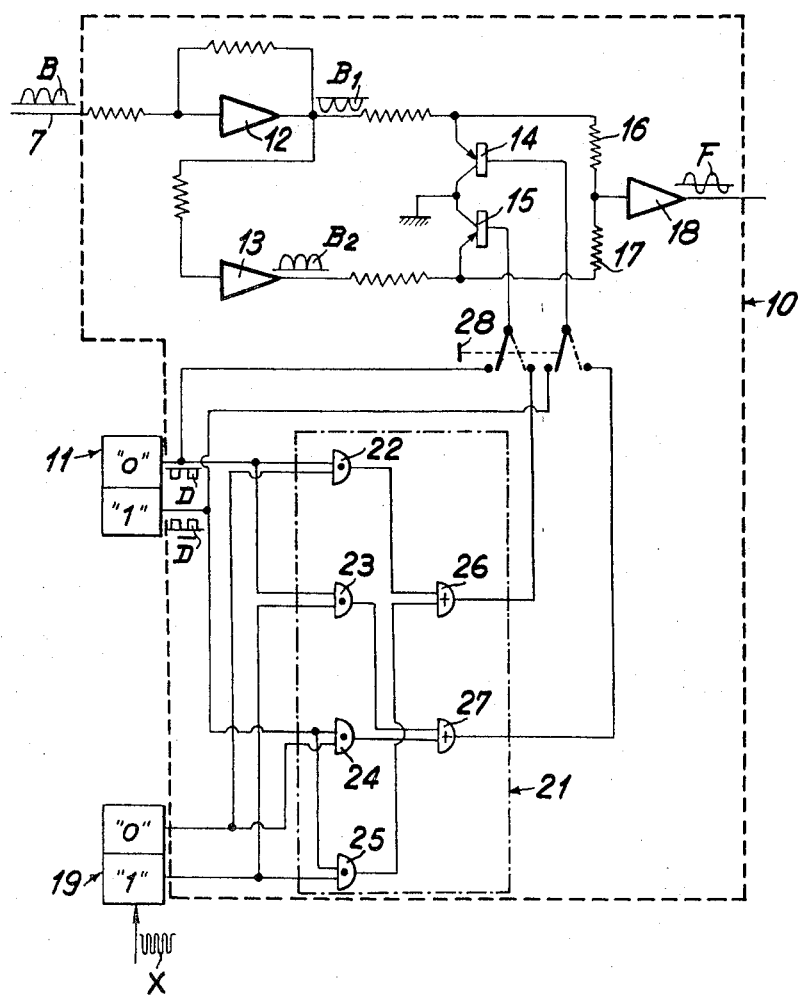
FIG. 3 is a wiring diagram of a specific form of embodiment of the modulator.

From the foregoing it is clear that when the counter 3 is operated in one and the other way through its 90 positions an alternation of the very low frequency sine signal can be generated. This cycle is repeated continuously so that at the output of generator 2, i.e. in line 7, a signal B is obtained which appears in the form of a "rectified" sine signal. Therefore, to obtain a complete sine signal, it is necessary to reverse every other alternation. To this end, the rectified sine signal B is fed to a modulator circuit 10 of which a typical exemplary and not limiting form of embodiment is illustrated in FIG. 3. This modulator 10 is responsive to a polarity-reversing bistable multivibrator 11 receiving at its input end the output signal C from the reversing multivibrator 8. The bistable multivibrator 11 is switched at a frequency corresponding to one-half of the frequency of the reversing multivibrator 8 and delivers at its output end a square control signal D and a complementary signal $\overline{D}$ both fed to modulator 10.

The modulator 10 (FIG. 3) comprises a first operational amplifier 12 receiving at its input end the rectified sine signal B from line 7. The output of this amplifier 12 is connected to the input of another operational amplifier 13. These highly-stable amplifiers 12 and 13 are identical and their function is to reverse the input signal. The first operational amplifier 12 will thus deliver at its output terminal negative sine alternations $B_1$ (FIG. 3) and the second operational amplifier 13 delivers at its output terminal positive sine alternations $B_2$.

The outputs of the two operational amplifiers 12 and 13 are connected to the input of an output amplifier through the medium of an electronic switching device consisting, in this specific form of embodiment, of a pair of PNP-type series-connected transistors 14 and 15. The emitters of these transistors 14 and 15 are connected respectively to the outputs of the operational amplifiers 12 and 13, their collectors are jointly earthed and their bases are connected respectively to the outputs "1" and "0" of the polarity-reversing multivibrator 11 through the medium of a switch 28. The resistors 16 and 17 are also connected in series across the outputs of amplifiers 12 and 13, and their junction is connected to the input of an output amplifier 18.

In the inoperative position of switch 28, the polarity reversing multivibrator 11 feeds its signal D for example to the base of transistor 15 and the complementary signal $\overline{D}$ to the base of transistor 14, so that both transistors are alternatively conducting and nonconducting. In other words, when transistor 14 is rendered conducting by signal $\overline{D}$, transistor 15 is rendered nonconducting by signal $\overline{D}$, and vice-versa. Each time transistor 15 is blocked and transistor 14 is conducting a positive alternation of signal $B_2$ is transmitted to amplifier 18. Conversely, when transistor 14 is blocked and transistor 15 is conducting a negative alternation of signal $B_1$ is transmitted to amplifier 18. Thus a complete sine signal F appears at the output of this amplifier 18 as illustrated by the line F of FIG. 2.

The modulator has another function, namely that consisting in delivering at its output, if desired, a carrier wave, for example at a frequency of 2,400 Hz., modulated by a very low frequency signal, in the case of systems comprising an input demodulator. To this end, the signal X of the carrier wave is fed to a bistable multivibrator 19 having its "0" and "1" outputs connected to a logical circuit contained in the block 21 of FIG. 3. The "0" and "1" outputs of multivibrator 11 constituting the polarity reversing device are also connected to the logical circuit 21.

This logical circuit 21 comprises four AND gates 22, 23, 24 and 25, each gate having two inputs, the two inputs of AND gate 22 being connected to the "0" outputs of both multivibrators 11 and 19, those of AND gate 23 to the "0" output of multivibrator 11 and to the "1" output of multivibrator 19, those of AND gate 24 to the "1" output of multivibrator 11 and to the "0" output of multivibrator 19, and finally those of AND gate 25 to the "1" outputs of both multivibrators.

The outputs of AND gates 22 and 25 are connected to the two inputs of an OR gate 26 and the outputs of AND gates 23 and 24 are connected to the inputs of another OR gate 27. Switch 28, provided for connecting the bases of transistors 14 and 15 to the "1" and "0" outputs of multivibrator 11 in the inoperative position, connects said bases to the outputs of OR gates 26 and 27 in the operative position.

When switch 28 is in its inoperative position as illustrated in FIG. 3 the multivibrator 11 controls alone the alternate switching of transistors 14 and 15, so that the emitted signal F is a sine signal of very low frequency, as already explained hereinabove.

On the other hand, when switch 28 is in its operative position shown in dash-and-dot lines in the drawing the bases of transistors 14 and 15 are connected to the outputs of the aforesaid logical circuit 21. Under these conditions the signal X of the carrier wave which is fed to multivibrator 19 and converted beforehand into a square signal by this multivibrator 19 appears at the output of the logical circuit 21 with a polarity reversed upon each change of condition of the polarity-reversing multivibrator 11, i.e. when the very low frequency signal passes through its zero-value position. The output amplifier 18 is then in the condition of a selective amplifier capable of delivering at its output a very low frequency modulated carrier sine wave.

The signal F generated in the above-described circuitry, i.e. the assembly comprising generator 2 and modulator 10 (which is a very low frequency signal or a modulated carrier wave) is then fed to the input of the system to be controlled, which is shown very diagrammatically in block form at 29 in FIG. 1. This system 29 delivers at its output end a signal $F_1$ permitting of measuring the phase shift introduced during the passage through this system. To this end the apparatus according to this invention comprises a measuring counter 31 in the form of a binary counter giving a direct indication of the phase shift in degrees. This counter comprises a chain of bistable multivibrators connected in a manner known per se, wherein the first multivibrator 32 constitutes a divider by "2" device for a purpose to be explained presently. This multivibrator is connected to the output of a gate 33 having its input connected to the output of generator 1. Therefore, when gate 33 is open, the counter 31 integrates the clock pulses A from generator 1.

The counter 31 also comprises a resetting terminal 34 connected to the diode logical matrix 5 in order to reecive the resetting signal H each time the very low frequency signal F passes through its zero level position in the upward direction, i.e. every 360 degrees when the counter indicates the digit "0" at the end of a measuring cycle. The matrix 5 is also connected by a conductor 35 to a control input of gate 33 so as to receive a signal I for starting the counter 31 each time the very low frequency signal B passes through zero, that is, every 180 degrees.

The counter 31 is stopped when the very low frequency signal $F_1$ having passed through the circuit 29 to be controlled is at zero value. To this end, this signal $F_1$ is fed to a zero detector 36 consisting of a continuous high-stability, high-gain operational transformer followed by a multivibrator. This detector 36 will thus convert the very low frequency signal $F_1$ into square signals. The gain produced by this assembly is so adjusted that its condition changes when the input voltsge $v$ is considerably lower than the voltage $v_1$ corresponding to a degree of phase shift in order to avoid the introduction of measuring errors.

The zero detector 36 delivers pulses K (FIG. 2) each time the phase-shifted signal $F_1$ passes through zero. These pulses are fed to a control input of gate 33 in order to close this gate and thus stop immediately the operation of counter 31.

The various stages of the measuring counter 31 are connected by means of gates 37 to the corresponding stages of a memory system 38 consisting of a multivibrator recorder followed by a diode logical matrix supplying tell-tale lamps, thus permitting the readout of the phase-shift indication. The gates 37 are controlled by a readout signal G (FIG. 2) fed simultaneously thereto by a conductor 39 connected to all the gates 37 and to an output of the diode logical matrix 5. The readout signal is delivered every 360 degrees, at the end of each measuring cycle.

Now the operation of the apparatus of this invention will be described. Assuming that the apparatus is in the condition obtaining at the beginning of a measuring cycle, i.e. when the first pulse A emitted by the square signal generator 1 is fed to counter 3, so that the first voltage step $V_1$ of the rectified sine signal B appears at the output of generator 2. The reversing multivibrator 8 is then in condition "1" (signal C at level "1") as well as the polarity reversing multivibrator 11 (signal D at level "1"). At the beginning of the cycle the diode logical matrix 5 delivers via conductor 39 a readout signal G adapted to pick up the digit information contained in counter 31 and to memorize same in the multivibrator recorder 38. This will cause the preceding measure to be read out. Then, the diode logical matrix 5 delivers an order for resetting the counter 31, which causes a pulse H to be fed to terminal 34. The counter 31 is thus reset instantaneously. The logical matrix 5 then delivers an order for starting the counter 31 whereby another phase shift measurement can be made. This order consists of a pulse $I_1$ delivered immediately after the resetting pulse H. This starting pulse $I_1$ is fed to gate 33 and opens same. Therefore, from this moment on, the counter 31 begins to integrate the A pulses emitted by generator 1. This counting is effected until the very low frequency signal $F_1$ having passed through the controlled circuit 29 resumes again the zero value. At this time the detector 36 responsive to the passage of this signal $F_1$ through zero feeds a pulse $K_1$ to gate 33, thus closing this gate and stopping the counting. The counter 31 has then integrated the digit value $\Phi_1$ of the phase shift between signals F and $F_1$.

At the next passage through zero of the incident signal F the diode logical matrix 5 delivers another starting signal $I_2$ to the gate 33 to open same, so that the counter 31 is started again. The counter is again stopped by the next signal $K_2$ emitted by detector 36 during the passage of signal $F_1$ through zero, so that the counter 31 has integrated at that time, in addition, the digit value $\Phi_2$ of phase shift between signals F and $F_1$ after a half-cycle. Actually, due to the provision of the multivibrator 36 for dividing by two the counter 31 has recorded at the end of the cycle the arithmetical average of the phase-shift value, or otherwise expressed $$\frac{\Phi_1+\Phi_2}{2}$$

This permits of cancelling any error in the measurement of the phase shift which might be caused by an offsetting in the continuous level (false zero introduced by the analysis system, for example) or by a distortion introduced by even harmonics (odd harmonics have no influence on the passage through zero). Of course, if there is no continuous level shift, $\Phi_1=\Phi_2$. On the other hand, if the shift is $x$ (FIG. 2) the detector 36 will deliver pulses $K_3$ and $K_4$ giving the measurement of the phase shift $\Phi_3$ and $\Phi_4$, but the final measurement is the same in all cases since $$\frac{\Phi_1+\Phi_2}{2}=\frac{\Phi_3+\Phi_4}{2}$$

At the end of the cycle, i.e. at 360°, and at the beginning of the next cycle, the diode logical matrix 5 emits the readout signal G delivered to gates 37 for transferring the measurement value of counter 31 to the multivibrator recorder 38.

What I claim is:

1. A digit phasemeter designed for measuring the phase shift of an electric signal introduced by an element to be controlled, which comprises a generator of clock pulses having a constant but adjustable frequency $f$, a generator of reference sine signal having a very low frequency $f_1$ which is connected to the output of said clock pulse generator, the frequency $f_1$ of said sine signal and the frequency $f$ of said clock pulses having the relationship $f=360\ kf_1$ wherein $k$ is an integer, the output of said reference sine signal generator being connected to the input of the element to be controlled, said reference sine signal generator including means for determining the passage through zero value of the reference sine signal, a zero-value detector connected to the output of said element to be controlled for determining the moment of the passage through zero value of the phase-shifted signal emitted from said element, a first measuring counter connected to said clock pulse generator and adapted to integrate the number of clock pulses emitted by said clock pulse generator, an indicator device connected to said first measuring counter and means connected to said generator and said zero-value detector for resetting and then restarting said first measuring counter each time said reference sine signal attains its zero value and subsequently, for stopping said first measuring counter each time said phase-shifted signal attains its zero value, whereby the digit value recorded in said first measuring counter when it is stopped corresponds to the number of degrees of the phase shift between said reference sine signal and the phase shifted signal appearing at the output of said controlled element.

2. A digit phasemeter as set forth in claim 1, wherein said reference sine signal generator comprises on the one hand a rectified sine signal generator comprising a second counter having two directions of operation and ninety positions and relevant outputs, a diode logical matrix comprising a series of first parallel inputs, a series of second parallel inputs and a series of first parallel outputs, said first inputs of said diode logical matrix being respectively connected to the outputs of said ninety positions of said second counter, sources of potentials having different levels, connected respectively to said second parallel inputs of said diode logical matrix, an OR circuit having its inputs connected respectively to said first outputs of said diode logical matrix, a single output line connected to the output of said OR circuit and in which a rectified stepped sine signal is produced, and, on the other hand, a modulator connected to said single output line for converting said rectified sine signal into a complete reference sine signal.

3. A digit phasemeter as set forth in claim 2, comprising a monostable multivibrator connected to said second counter in order to keep said second counter in each one of its endmost positions during two successive integrated clock pulses.

4. A digit phasemeter as set forth in claim 2, which comprises a bistable reversing multivibrator controlling the counting direction of said second counter and which is so connected to said second counter that it will change its condition at the end of each counting cycle in one or the other driection, and a polarity-reversing bistable multivibrator connected to the output of said direction-reversing bistable multivibrator, said polarity-reversing bistable multivibrator being so connected to said modulator that it will permit the passage therethrough, alternatively, of one alternation of the rectified sine signal and an opposite alternation of the same signal in order to produce a complete reference sine signal at the output of said modulator.

5. A digit phasemeter as set forth in claim 4, wherein said modulator comprises a first operational amplifier having its input connected to said single output line connected in turn to said OR circuit, another operational amplifier having its input connected to the output of said first operational amplifier, both operational amplifiers having each a reversing function, an output amplifier, and an electronic switch connected to the outputs of said first and second operational amplifiers and to the input of said output amplifier, said electronic switch being connected to said polarity-reversing bistable multivibrator so as to be switched upon each change in the level of the output signal of said bistable multivibrator.

6. A digit phasemeter as set forth in claim 5, wherein said modulator further comprises two transistors connected in series between the outputs of said first and second operational amplifiers, a pair of resistors connected in a series circuit connected in turn in parallel to said transistors, the junction of said resistors being connected to the input of said output amplifier, the bases of said transistors being connected respectively to the "1" and "0" outputs of said polarity-reversing bistable multivibrator.

7. A digit phasemeter as set forth in claim 6, wherein said modulator further comprises a logical circuit comprising in turn first, second, third and fourth AND gates and first and second two-input OR gates, a modulation bistable multivibrator adapted to receive a modulating carrier wave at its input, the two inputs of said first AND gate being connected respectively to the "0" outputs of said polarity-reversing bistable multivibrator and to the "1" output of said modulation multivibrator, the two inputs of said third AND gate being connected respectively to the "1" output of said polarity-reversing multivibrator and to the "0" output of said modulation multivibrator, the two inputs of said fourth AND gate being connected respectively to the "1" outputs of the two polarity-reversing and modulation multivibrators, the outputs of said first and fourth AND gates being connected to the two inputs of said first OR gate, the outputs of said second and third AND gates being connected to the two inputs of said second OR gate, and a second switch adapted to be set in one or two positions and connecting, in its first position, the outputs of said first and second OR gates respectively to the bases of said transistors, and, in its second position, the bases of said transistors directly to the "0" and "1" outputs of said polarity-reversing bistable multivibrator.

8. A digit phasemeter as set forth in claim 2, which comprises a logical gate having first, second and third inputs and an output, a bistable multivibrator adapted to divide by two which has its input connected to the output of said logical gate and its output connected to the input of said first measuring counter, the first input of said logical gate being connected to the output of said clock pulse generator, another output of said diode logical matrix which is adapted to indicate a counter starting signal each time said rectified sine signal is at zero value, said second input of said logical gate acting as an opening control input and being connected to the second output of said diode logical matrix, the third input of said logical gate acting as a closing control input and being connected to the output of said zero detector.

9. A digit phasemeter as set forth in claim 8, wherein said indicator consists of a multistage bistable multivibrator recorder comprising a plurality of two-input AND gates, the first inputs of said AND gates being connected respectively to the outputs of the various stages of said first measuring counter, the outputs of said AND gates being connected to the inputs of the corresponding stages of said recorder, and a third output of said diode logical matrix whereat a readout signal appears each time the aforesaid reference sine signal passes through zero in either increasing or decreasing direction, said second inputs of said AND gates being connected jointly to the third output of said diode logical matrix.

10. A digit phasemeter as set forth in claim 8, which comprises a fourth output of said diode logical matrix whereat a signal for resetting said first measuring counter is caused to appear as a consequence of each readout signal and slightly before the signal for starting said first measuring counter, and a terminal for resetting said first measuring counter which is connected to said fourth output of said diode logical matrix.

References Cited

UNITED STATES PATENTS 3,271,666 9/1966 Anderson et al. _____ 324—57

EDWARD E. KUBASIEWICZ, Primary Examiner

U.S. Cl. X.R.

324—83